United States Patent
Thaden et al.

(10) Patent No.: US 8,498,423 B2
(45) Date of Patent: Jul. 30, 2013

(54) DEVICE FOR AND A METHOD OF PROCESSING AUDIO SIGNALS

(75) Inventors: Rainer Thaden, Eindhoven (NL); Cornelis Pieter Janse, Eindhoven (NL); David Antoine Christian Marie Roovers, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 890 days.

(21) Appl. No.: 12/664,467

(22) PCT Filed: Jun. 16, 2008

(86) PCT No.: PCT/IB2008/052363
§ 371 (c)(1),
(2), (4) Date: Dec. 14, 2009

(87) PCT Pub. No.: WO2008/155708
PCT Pub. Date: Dec. 24, 2008

(65) Prior Publication Data
US 2010/0189274 A1    Jul. 29, 2010

(30) Foreign Application Priority Data
Jun. 21, 2007   (EP) ..................................... 07110807

(51) Int. Cl.
  *H04B 3/20*   (2006.01)
  *H04M 9/08*   (2006.01)
(52) U.S. Cl.
  USPC ................... 381/66; 379/406.05; 379/406.15; 370/289
(58) Field of Classification Search
  USPC ... 381/66; 379/406.01–406.16; 370/286–292; 455/570
  See application file for complete search history.

(56) References Cited

U.S. PATENT DOCUMENTS

| | | | |
|---|---|---|---|
| 5,121,426 A | 6/1992 | Baumhauer, Jr. et al. | |
| 5,323,458 A | 6/1994 | Park et al. | |
| 5,680,450 A * | 10/1997 | Dent et al. | 379/406.08 |
| 6,546,099 B2 | 4/2003 | Janse | |
| 6,597,787 B1 * | 7/2003 | Lindgren et al. | 379/406.05 |
| 7,209,566 B2 * | 4/2007 | Griniasty | 381/59 |
| 8,155,302 B2 * | 4/2012 | Roovers | 379/406.05 |

(Continued)

FOREIGN PATENT DOCUMENTS

| | | |
|---|---|---|
| WO | 9804079 A2 | 1/1998 |
| WO | 9927522 A2 | 6/1999 |

(Continued)

OTHER PUBLICATIONS

Roovers: "Beamforming With Microphone Arrays"; Nat. Lab. Technical Note Apr. 2001, Koninklijke Philips Electronics N.V., 2001, 44 Page Document.
Belt et al: "Adaptive Beamforming for Speech Enhancement"; Nat. Lab. Technical Note 077/98, Philips Electronics, 1999, 65 Page Document.

(Continued)

*Primary Examiner* — Xu Mei

(57) ABSTRACT

A method is provided which is suitable to cope with non-linear echo paths during acoustic echo cancellation in speakerphones. Non-linear paths occur particularly in hands-free operation of, e.g., a mobile phone, due to driving the amplifier and loudspeaker in the non-linear range. The idea is to combine the commonly known one microphone approach of linear acoustic echo cancellation using an adaptive filter and a post-processor together with a multiple microphone approach using beam forming which separately removes the non-linear part of the echo.

20 Claims, 4 Drawing Sheets

U.S. PATENT DOCUMENTS

| | | | |
|---|---|---|---|
| 8,175,871 B2 * | 5/2012 | Wang et al. ................... | 704/227 |
| 8,284,947 B2 * | 10/2012 | Giesbrecht et al. ............. | 381/66 |
| 8,340,317 B2 * | 12/2012 | Pfaffinger et al. ............. | 381/93 |
| 2006/0147063 A1 | 7/2006 | Chen | |
| 2006/0188089 A1 | 8/2006 | Diethorn et al. | |

FOREIGN PATENT DOCUMENTS

| WO | 2005076662 A1 | 8/2005 |
|---|---|---|
| WO | 2005076663 A1 | 8/2005 |
| WO | 2005106841 A1 | 11/2005 |
| WO | 2006027707 A1 | 3/2006 |

OTHER PUBLICATIONS

Kellermann: "Strategies for Combining Acoustic Echo Cancellation and Adaptive Beamforming Microphone Arrays"; Acoustics, Speech, and Signal Processing, 1997, IEEE Computer Society, vol. 1, Apr. 21, 1997, pp. 219-222.

Herdordt et al: "Frequency-Domain Integration of Acoustic Echo Cancellation and a Generalized Sidelobe Canceller With Improved Robustness"; European Atransactions on Telecommunications, Wiley & Sons, Chichester, GB, vol. 13, No. 2, Mar. 1, 2002, pp. 123-132.

\* cited by examiner

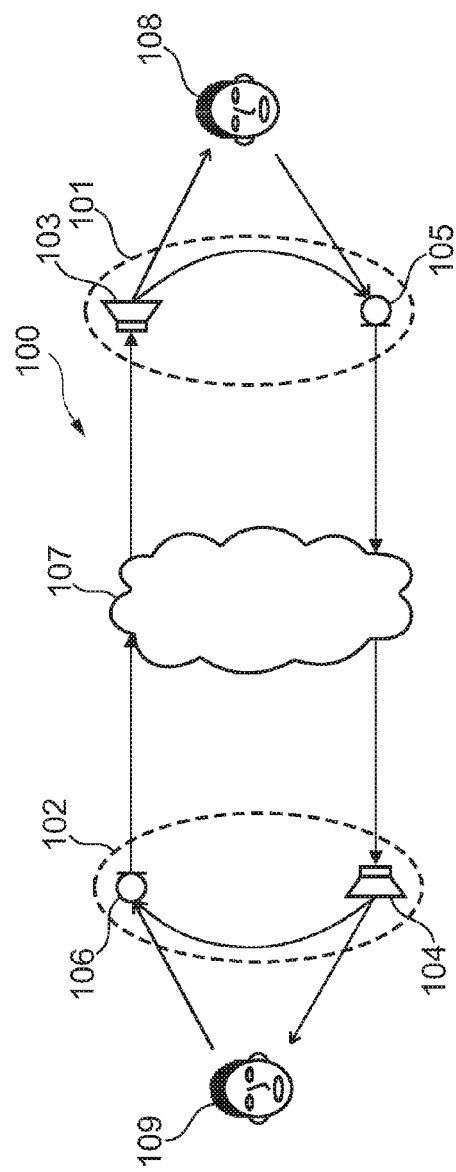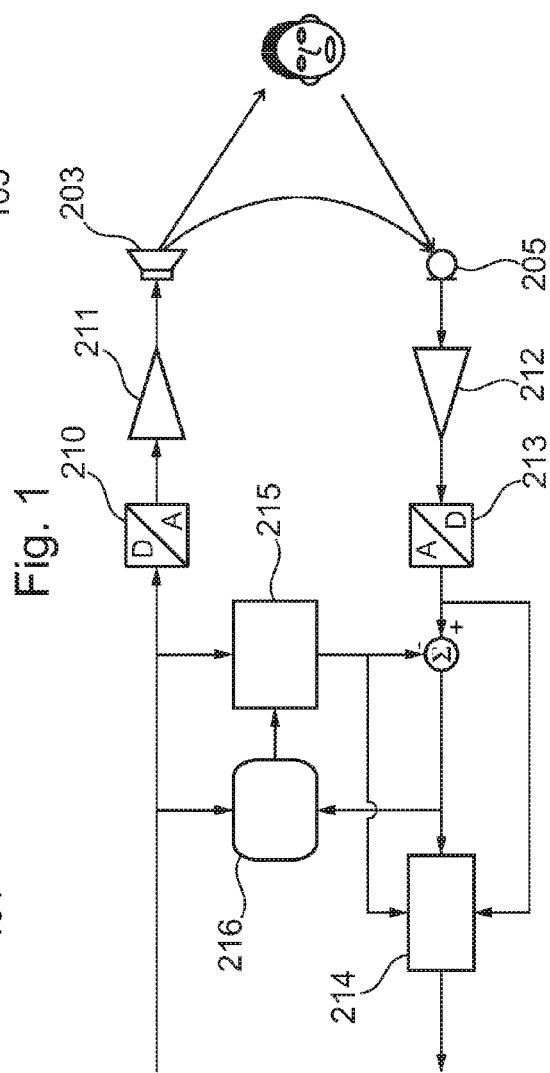
Fig. 1
Fig. 2

DEVICE FOR AND A METHOD OF PROCESSING AUDIO SIGNALS

FIELD OF THE INVENTION

The invention relates to a device for processing audio signals.

The invention further relates to a method of processing audio signals.

Moreover, the invention relates to a program element.

Further, the invention relates to a computer-readable medium.

BACKGROUND OF THE INVENTION

Systems for suppression audio distortions become more and more important. Particularly, in the field of high-quality hands-free telecommunication systems such as mobile phones, car kits, audio and teleconferencing systems, hands-free voice recognition devices, etc.

WO 2005/076662 discloses a system which is suited for suppressing audio distortion. The system comprises echo cancelling means coupled between an audio output and a distorted desired audio sensing microphone array, and a filter arrangement coupled to the echo cancelling means and/or the microphone array. The filter arrangement includes filter coefficients representing at least a part of the audio distortion, such as reverberation. The system also comprises an at least partly mirrored circuit arrangement for copying thereby simulated audio distortion representative filter coefficient values into the filter coefficients of said filter arrangement. Such copied values can be then used for suppressing reverberation in a distorted desired signal by the filter arrangement. Such a system and filter arrangement may be suitable to suppress echo distortion in the form of echo tail part reverberation in an audio signal sensed by a microphone array.

However, there may be still a need to provide a system which further improves echo cancellation in an audio system, in particular in a hands-free telecommunication system.

SUMMARY OF THE INVENTION

It is an object of the invention to provide an efficient echo cancellation audio system and echo cancellation method.

In order to achieve the object defined above, a device for processing audio signals, a method of processing audio signals, a program element, and a computer-readable medium according to the independent claims are provided.

According to an exemplary embodiment a device for processing an audio signal comprises a pre-processing unit, and a post processing unit, wherein the pre-processing unit is adapted to estimate a first echo signal indicative for a first linear echo cancellation component based on a received first audio signal and is further adapted to estimate a second echo signal indicative for a non-linear echo cancellation component based on the received first audio signal and a picked-up second audio signal, and wherein the post-processing unit is adapted for post-processing a primary output signal associated with the picked-up second audio signal taking into account the first echo signal and the second echo signal.

According to an exemplary embodiment a method of processing a picked-up audio signal comprises receiving a first audio signal, estimating a first echo signal indicative for a first linear echo cancellation component based on the received first audio signal, picking up a second audio signal, estimating a second echo signal indicative for a non-linear echo cancellation component based on the received first audio signal and the picked-up second audio signal, and processing a primary output signal associated with the picked-up second audio signal taking into account the first echo signal and the second echo signal. In particular, the estimation of the first echo signal may also be based on the picked-up second audio signal, e.g. the picked-up second audio signal may be used as an input for generating a control signal for the estimation of the first echo signal. However, in many cases the picked-up second audio signal is not an input signal from which the first echo signal is derived but only used as a signal for generating a control signal used by the estimation of the first echo signal. This may be in contrast to the estimation of the second echo signal, since in many cases in the estimation of the second echo signal the picked-up second audio signal is a signal component from which the second echo signal is derived from and not only used for generating a control signal for the estimation.

According to an exemplary embodiment a program element is provided, which, when being executed by a processor, is adapted to control or carry out a method of processing an audio signal, wherein the method comprises receiving a first audio signal, estimating a first echo signal indicative for a first linear echo cancellation component based on the received first audio signal, picking up a second audio signal, estimating a second echo signal indicative for a non-linear echo cancellation component based on the received first audio signal and the picked-up second audio signal, and processing a primary output signal associated with the picked-up second audio signal taking into account the first echo signal and the second echo signal.

According to an exemplary embodiment a computer-readable medium is provided, in which a computer program is stored which, when being executed by a processor, is adapted to control or carry out a method of processing an audio signal, wherein the method comprises receiving a first audio signal, estimating a first echo signal indicative for a first linear echo cancellation component based on the received first audio signal, picking up a second audio signal, estimating a second echo signal indicative for a non-linear echo cancellation component based on the received first audio signal and the picked-up second audio signal, and processing a primary output signal associated with the picked-up second audio signal taking into account the first echo signal and the second echo signal.

The audio processing according to embodiments of the invention can be realized by a computer program, that is, by software, or by using one or more special electronic optimization circuits, that is in hardware, or in hybrid form, that is by means of software components and hardware components.

In this application, the term "non-linear echo signal" may particularly denote an echo signal introduced by parts in a transducer chain, e.g. by loudspeakers, working in their respective non-linear range. This may for example hold for amplifiers and loudspeakers. Another kind of non-linear echo signals may be caused by mechanical vibrations of a housing. All these causes may result in non-linearly distorted echo components in a microphone signal, e.g. of a phone or mobile phone, car kits, audio and teleconferencing systems, hands-free voice recognition devices.

In this application, the term "picked-up audio signal" or "picked-up audio data" may particularly denote an audio signal picked-up by a microphone, e.g. by a microphone of a communication device like a phone or mobile phone. In particular, the term may denote the electrical signal generated from this acoustical wave.

In this application, the term "received audio signal" may particularly denote a signal received by a communication device, e.g. a signal transmitted from another communication device to the device receiving the audio signal. The received audio signal may correspond to the so-called far end signal in the context of communication. That is, to the audio signal that is transmitted from one communication device through a line or by aerial transmission to a second communication device the so-called near-end device.

In this application, the term "echo" may in particular denote a disturbance introduced by a received signal sent by a first device into a picked-up signal which is intended to be transmitted to from a second device back to the first device. For example, the first device and the second device may be communication devices, like mobile phones. In this case such "echoes" may in particular, annoying and cause problems in case the communication is done in so-called free-speech, i.e. the communicating people do not hold the mobile phone close to their ears.

By separating the linear echo components and the non-linear echo components of a picked-up audio signal it may be possible to independently control the post-processing, e.g. spectral subtraction, for these two components, which may overcome the problem of having to use high over subtraction for the linear echo. Furthermore, it may be possible that the linear echo component may be cancelled using well established robust and practically proven linear echo cancellers while additionally a solution may be provided to cope with the nonlinearities, e.g. by using a beam forming approach.

A gist of an exemplary aspect of the invention may be seen in the fact that linear echo cancellation may be combined with echo cancellation which also takes into account non-linear echoes. Such non-linear echo cancellation may be performed by using so-called beam forming. Thus, it may be possible to separate linear and non-linear echoes which may enable to independently control spectral subtraction of linear and non-linear echoes in a post-processor of the device.

Next, further exemplary embodiments of the invention will be described.

In the following, further exemplary embodiments of the device for processing audio signals will be explained. However, these embodiments also apply for the method of processing audio signals, for the program element and for the computer-readable medium.

According to another exemplary embodiment of the device the post-processing unit is further adapted to take the second echo signal only in time periods the device receives a received audio signal.

Such time periods may be for example time periods in which far end speech is present in case of a telecommunication device, e.g. a phone or mobile phone. By adapting the post-processing unit in such a way it may be possible to simplify the processing algorithm used, in particular, since in case to far end activity is present the non-linear component or part possibly does not contain any echo. Furthermore, in case no far end activity or far end speech is present, i.e. in case only near-end speech is present, the picked-up audio signal may not be affected by speech leakage, e.g. by speech leakage of a part or element of the post-processing unit.

According to another exemplary embodiment of the device the pre-processing unit comprises two filter units for estimating a first intermediate echo signal and a second intermediate echo signal. Such an estimating may be done by estimating the influence of an echo path for the emitted audio signal between the audio source unit and the pick-up unit. Alternatively, the pre-processing unit may comprise only a single filter unit. In particular, the filter(s) may be formed by adaptive filter(s), which may be controlled by a control signal based on the picked-up second audio signal and an output signal of the adaptive filter(s) itself, i.e. a feedback mechanism may be implemented to control the adaptive filter(s).

According to another exemplary embodiment of the device the pre-processing unit comprises a beam forming unit for estimating the first echo signal and the second echo signal. In particular, the beam forming unit may be adapted to receive the first intermediate echo signal, the second intermediate echo signal, and a preprocessed picked-up second audio signal In this application, the term "preprocessed picked-up audio signal" may particularly denote a picked-up audio signal already preprocessed, e.g. by a linear echo compensation possibly followed by beam forming or by subtracting the intermediate echo signals from the picked-up second audio signal.

Such a beam forming unit may be a suitable element to determine and/or estimate a non-linear echo component which may afterwards be used to perform echo cancellation in order to generate a desired output audio signal, i.e. an output audio signal of the device having a reduced echo component.

According to another exemplary embodiment of the device the beam forming unit comprises a first beam forming subunit and a second beam forming subunit. In particular, the first beam forming subunit may be adapted to generate the primary output signal and a third intermediate echo signal. Optionally, the first beam forming subunit may comprise an additional filter unit for filtering the third intermediate echo signal to generate the second echo signal. As an input the first beam forming subunit may receive the preprocessed picked-up second audio signal.

According to another exemplary embodiment of the device the first beam forming subunit is further adapted to determine values of control coefficients in such a way that the output power of the primary output signal is maximized.

According to another exemplary embodiment of the device the second beam forming subunit is adapted to receive the first intermediate echo signal and the second intermediate echo signal and is further adapted to generate the first echo signal by using the values of the control coefficients.

By feeding the first intermediate echo signal and the second intermediate echo signal into the second beam forming subunit it may be ensured that the linear echo component may be processed the same way as the so-called residual signal, i.e. the picked-up second audio signal which may comprise a first portion and a second portion from which the first intermediate echo signal and the second intermediate echo signals are subtracted, respectively. For picking up the first portion and the second portion of the second audio signal the device may comprise a first pick-up unit which is adapted to pick up the first portion of the picked-up second audio signal and a second pick-up unit which is adapted to pick up the second portion of the picked-up second audio signal. It should be noted that more than two pick-up units may be used.

According to another exemplary embodiment of the device the post-processing unit is adapted to generate an output signal based on the primary output signal, the first echo signal and the second echo signal by spectral subtracting the first echo signal, the second echo signal from the summed primary output signal and first echo signal. In particular, the post-processing unit may be adapted for generating a gain function from amplitude spectra of the primary output signal, the first echo signal, the second echo signal, and linear combinations thereof. Such a linear combination may be in particular, the sum of the primary output signal and the first echo signal, or the difference between the primary output signal and the second echo signal. Such a gain function may be used to multiply the spectrum of the primary output signal, or the spectrum of the difference of the primary output signal and the second echo signal, by the gain function. In particular, the primary output signal is delayed before it is multiplied by the gain function. Using the gain function, it may be ensured that the output signal and the primary output signal, or the difference of the primary output signal and the second echo signal, may have the same phase.

In the following, further exemplary embodiments of the method of processing audio signals will be explained. However, these embodiments also apply for the device for processing audio signals, for the program element and for the computer-readable medium.

According to another exemplary embodiment of the method the processing of the picked-up signal involves spectral subtraction. In particular, the spectral subtraction may be performed independently for the first echo signal and the second echo signal.

An exemplary aspect of the invention may be seen in the fact to combine linear echo cancellation with beam forming and thereby possibly separating linear and non-linear echo which may enable to independently control spectral subtraction of linear and non-linear echoes in a post processor. The linear echo may be cancelled using two adaptive filters and a post processor or post processing unit, while the non-linear part may be treated using two or more pick-up units, e.g. microphones, applying beam forming and considering an audio source unit, e.g. a loudspeaker, as an interfering source which may be suppressed by a generalized so-called side lobe canceller. In this case it may not matter if the signal path, i.e. the influence of the path the signal travels between audio source unit and pick-up unit, is non-linear, since, ideally, any sound coming from the direction of the audio source unit may be suppressed due to the directivity characteristics of the generalized side lobe canceller. An eliminated linear echo may be passed through a second "fixed" beam former, wherein "fixed" means that it may use the same coefficients as the first adaptive beam former. With this it may possible to separate the incoming signal into a desired speech signal, the linear echo and the non-linear echo. This may allow to independently controlling a spectral subtraction for the non-linear part or non-linear component which may overcome the problem of having to use high over subtraction for the linear echo. When using the beam forming approach according to this exemplary aspect it may be possible to deliver at least a sufficient echo suppression for the linear echo component even in cases the speaker and/or the communication device, e.g. phone, itself moves. Further, it may be possible to deliver sufficient echo cancellation even when the loudspeaker of the device is in an angle close to the angle of the desired speaker. Additionally, it may be possible to avoid a so-called coloration of the speech signal, since the first adaptive beam former provides a primary output signal and a so-called reference output or intermediate echo signal which contains no or only very few speech leakage.

The exemplary embodiments and aspects defined above and further aspects of the invention are apparent from the examples of embodiment to be described hereinafter and are explained with reference to these examples of embodiment.

BRIEF DESCRIPTION OF THE DRAWINGS

The invention will be described in more detail hereinafter with reference to examples of embodiment but to which the invention is not limited.

FIG. 1 schematically shows acoustic echoes in a hands free telecommunication system.

FIG. 2 schematically shows principles of an echo cancellation system with a post processor.

DESCRIPTION OF EMBODIMENTS

Figure 3:
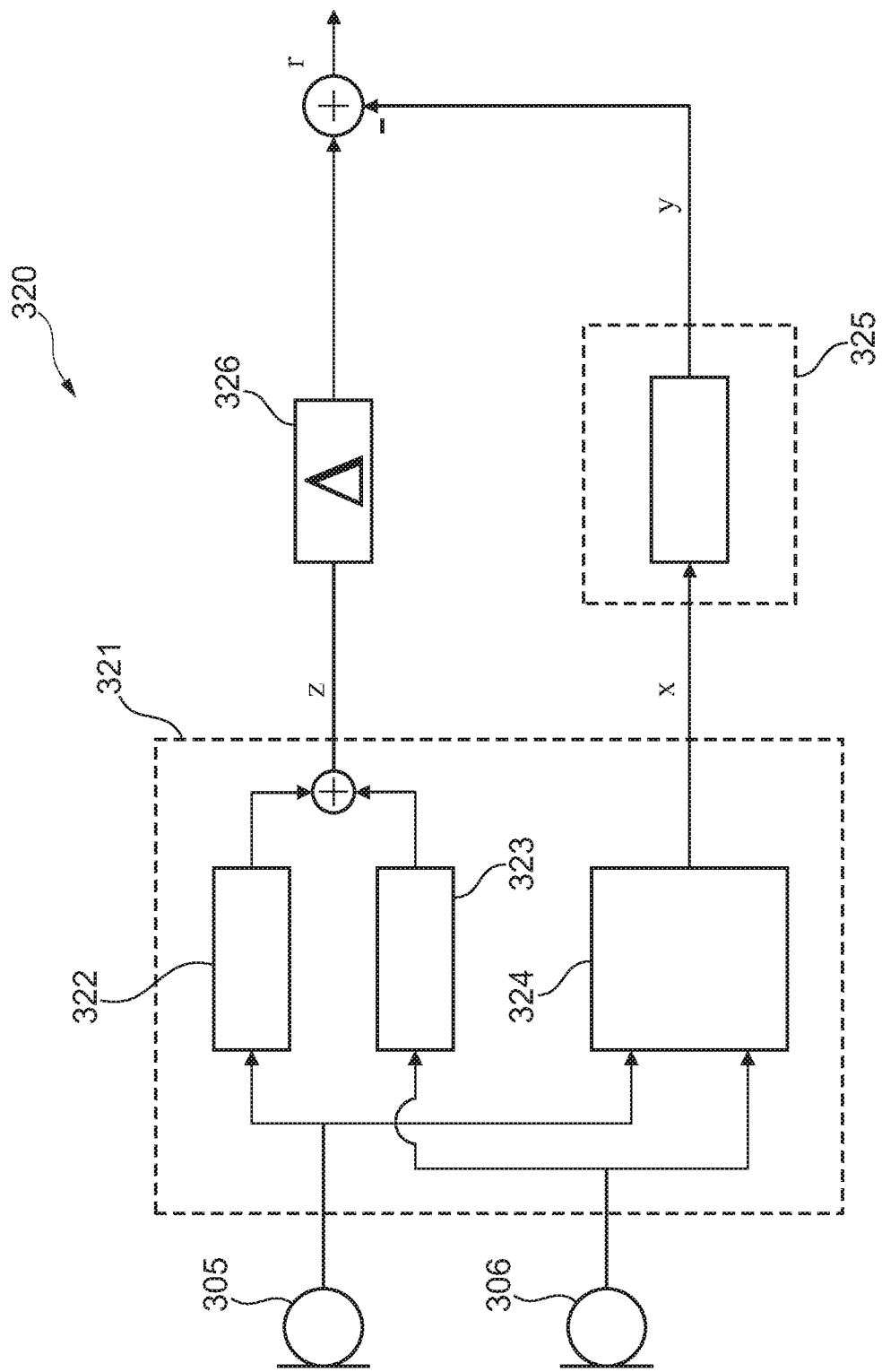
FIG. 3 schematically shows principles of a generalized side lobe canceller comprising a beam forming unit and an adaptive filter.

The illustration in the drawing is schematically. In different drawings, similar or identical elements are provided with the same reference signs.

In the following, referring to FIGS. 1 to 3 some basic principles of echo cancellations in communication devices, e.g. mobile phones will be explained.

The demand for high-quality hands-free telecommunication systems such as mobile phones, car kits, audio and video teleconferencing systems, hands-free voice recognition devices, PDA's, etc, is growing rapidly. It is recognized by the system manufacturers that the audio quality of such systems is of utmost importance for consumer acceptance and satisfaction. The same holds for network operators which gain higher revenues because conversations last longer when listening fatigue is reduced. A very-important problem involved in hands-free acoustic telecommunication systems concerns the elimination of acoustic echoes while maintaining full-duplex operation, and will be described in more detail afterwards. Firstly, with reference to FIGS. 1 and 2 a general setup of an acoustic telecommunication system is explained before afterwards the acoustic echo cancellation problem is explained.

FIG. 1 schematically shows a telecommunication system 100, comprising two acoustic telecommunication devices 101 and 102 each comprising a loudspeaker 103 and 104 and a microphone 105 and 106, respectively. A network 107 links these two telecommunication devices. Furthermore, two participators are schematically depicted as 108 and 109.

The two telecommunication devices 101 and 102 receive signals from and transmit signals to each other via some network or communication link 107, see FIG. 1. At each side, the signal received from the other side is processed (after demodulation to a baseband digital signal), converted from a digital into an analogue signal by a D/A-converter 210, amplified by a first amplifier 211, and then reproduced by a loudspeaker 203, see FIG. 2. At the same time, at each side the local acoustic signal is recorded by a microphone 205, amplified by a second amplifier 212, converted from an analogue into a digital signal by an A/D-converter 213, processed by a post-processing unit 214, and then transmitted to the other side (after proper modulation), see FIG. 2. Hence, in each terminal both the recorded and received digital signals are used for processing. As is clear from the figure, if the far-end side also operates in hands-free mode, the problem setup in principle is symmetric. In the following the problem scenario is considered from the point of view of the near-end side, which is assumed to operate in hands-free mode. Furthermore, an adaptive filter 215 and a control unit 216 are schematically depicted in FIG. 2.

Since the loudspeaker 203 emits the far-end signal into the environment around the near-end communication device, in addition to the desired effect that the near-end user can hear the far-end signal, there is the undesired effect that the loudspeaker 203 signal also propagates to the microphone 205. Hence, in addition to the desired near-end speech signal, the signal recorded by the microphone contains the far-end signal filtered by the near-end acoustic path. If the unprocessed microphone signal would be sent to the far-end side, the far-end user would also hear his own voice again, i.e. an echo would be present. In case of a strong acoustic coupling between far-end loudspeaker and microphone, a repetition of this process would result in "howling" of the signals.

The purpose of acoustic echo cancellation is to remove the echo signal produced at the near-end side while retaining the near-end speech signal, thereby allowing full-duplex communication and avoiding howling, as opposed to half-duplex communication where only one participant at a time can talk. It should be noted that a relevant aspect of full-duplex speech communication is that a near-end speaker can interrupt an active far-end speaker. During the brief interval of so-called double talk when both participants speak, it is of less importance that the near-end speech signals remain undistorted.

The basic idea of an acoustic echo canceller is to estimate the far-end echo component in the near-end microphone signal using both the far-end signal and the microphone signal. This echo is then subtracted from the microphone signal, ideally yielding a signal that only contains the near-end speech signal. The cleaned microphone signal is then transmitted to the far-end side, possibly after other processing such as noise suppression.

In hands-free mode, there is a large distance between the user and the device compared to the hand-set mode. In order to enable the user to clearly hear the far-end signal, the loudspeaker has to produce a large sound pressure level. Combined with the fact that in a mobile phone the loudspeaker and microphone are spaced quite closely, this results in a very strong echo signal compared to the near-end speech signal. In typical scenarios, the echo to near-end speech signal ratio can range from 10 till 25 dB. In addition, because of the large sound pressure level to be produced by the loudspeaker, several (cheap) parts of the transducer chain operate in their nonlinear range. For example, this holds for the amplifier and loudspeaker. Another kind of nonlinearity is caused by mechanical vibrations of the phone housing. All these causes result in non-linearly distorted echo components in the microphone signal: Since most mobiles and other acoustic telecommunication devices available on the market employ linear acoustic echo cancellers (AEC's), they cannot deal properly with nonlinearly distorted echoes. This, however, is very important because more and more quality is demanded.

In general an AEC usually consists of two main parts, see FIG. 2. The first is a adaptive filter 215 (usually in the form of a Finite-Impulse-Response filter), which adaptively models the total electro-mechanical-acoustical impulse response from the far-end signal to the microphone signal, i.e. among other things it should include the amplifier and loudspeaker characteristics, and the Acoustic Impulse Response (AIR) from the loudspeaker to the microphone. The adaptive filter may be a (Normalized) Least Mean Squares ((N)LMS), Recursive Least Squares (RLS), or Affine Projection (AP) algorithm, or any other algorithm known to a person skilled in the art. In practice, any adaptive filter can only partially remove the echo for several reasons. Firstly, as described above, this is due to the various nonlinearities. Secondly, because in practice the adaptive filter length is limited by complexity and memory restrictions, i.e. it has too few coefficients to properly model all the dynamics. Thus, the system is under-modeled. Finally, the acoustics around the terminal may change due to movements, temperature changes, and so on, thereby causing tracking difficulties for the adaptive filter. For these reasons, AEC's often have a second part consisting of a post-processor 214. Ideally, echo components not removed by the adaptive filter are suppressed in the post-processor, which can be seen as a time and frequency dependent gain function that selectively attenuates those frequency bins which still contain significant far-end echo. The principle functioning of a post processor is known to a person skilled in the art. Although post-processing can remove residual echoes to a certain extent, it also introduces distortion during double talk, especially during bad signal-to-echo ratios and with non-linear distortion, thereby harming the full-duplex functionality.

Although the basic principles of beam forming is known for a person skilled in the art to spatially separate sounds, some basic information of a so-called filter and sum beam former (FSB) is described in the following referring to FIG. 3 which shows a generalized side lobe canceller (GSC) 320 and two microphones 305 and 306 acting as input devices for the GSC. The GSC comprises a FSB 321 comprising two adaptive filters 322 and 323 which are coupled to the two microphones 305 and 306, respectively. That is, each microphone input is coupled to an adaptive filter. Furthermore, the FSB comprises a blocking matrix 324 which is coupled to the two microphones. An output of each of the two filters 322 and 323 is summed and forms a primary output z, while an output of the blocking matrix 324 forms a noise reference signal x which is inputted into a second stage adaptive filter 325 whose output is formed by a filter signal y of the second stage. The primary output z and the filter signal y are then subtracted from each other, wherein the primary output z is delayed by a delay element 326.

In short, a beam forming algorithm can be summarized: based on the input of multiple microphones in a sound field containing a desired signal, reverberation and noise, the FSB generates a primary output signal being an enhanced version of the microphone input in terms of signal to noise ratio and a noise reference signal x containing, ideally, anything but speech. In practice, of course, due to misalignment, short filter lengths and other non-ideal conditions, the primary signal still contains noise and the noise reference contains a part of the speech signal. The beam forming algorithm works as follows. The filters are adapted such that the output power of the primary signal is maximized. The blocking matrix 324 is used to block the speech signal producing a noise reference x containing stationary and non-stationary background noise but no speech.

In situations, were other interfering sources (interfering speaker, conference scenarios, TV; etc.) have to he cancelled, the generalized side lobe canceller (GSC) structure is used (see FIG. 3). Imagine desired talker in the beam of the FSB and an interfering talker in the background at a different angle. The noise reference as well as the primary output will contain the undesired signal of the interfering talker. The second stage of the GSC is only allowed to adapt when there is no desired speech. It is a valid assumption that there will be interfering speech in these periods, thus, the second stage adaptive filter identifies this interfering speech component in the primary signal and subtracts it which results in an output signal r. When used for echo cancellation, the second stage adapts only during far end activity and, therefore, cancels out the far end signal front the loudspeaker of the device. In other words, this approach tries to place a null in the directivity of the beam former in the direction of the interfering source (loudspeaker).

In a post-processor described in some detail afterwards, the noise in the primary signal can be reduced by spectral subtraction using the noise reference signal y.

A post-processor may be based on spectral subtraction techniques and may take as input the primary output signal z of the FSB 321 and the filter signal y of the second stage. The input samples are processed by a so-called Hanning window on a frame basis and next transformed to the frequency domain by an FFT. The two obtained complex valued spectra are denoted by Z(f) and Y(f) and the spectral magnitudes by |Z(f)| and |Y(f)| wherein f denotes the frequency index of the FFT result. The spectrum of the residual signal R(f) is calculated in the post-processor simply by subtracting the complex spectra Z(f) and Y(f). The post-processor, then, applies the following spectral subtraction rule:

$$|O(f)|=|Z(f)|-\gamma|Y(f)| \quad (1)$$

where $\gamma$ is a so-called over-subtraction parameter which influences the amount of spectral subtraction. The output spectral magnitude |O(f)| is simply combined with the phase of the residual signal R(f). Finally, the time-domain output signal o is constructed from its complex spectrum using a well-known overlapped reconstruction algorithm.

The problem of conventional solutions for acoustic echo cancelling as in FIG. 2 is that they rely on the fact that the echo path (amplifier, speaker, propagation to microphone) is linear which does not hold for e.g. mobile hands-free phones as already described above. Thus, the nonlinear fraction of the echo will get through to the far end talker. A usual way to avoid this is to use special subtraction in the post-processor setting the linear suppression to rather high values, actually subtracting way too much linear signal (over subtraction) which cancels most of the nonlinearities but deteriorates double talk performance severely.

To get a better understanding of this, one must consider where the nonlinearities originate from. When the loudspeaker membrane is driven to high excursions, the voice coil of the speaker partially leaves the magnetic field, thus, the coupling between electrical input and acoustic output decreases. A sine-wave, e.g. would get a "rounded" top when driven into the nonlinear region causing harmonic distortions (in multiples of the frequency) in the acoustic signal. When viewed in time, this means that the nonlinearities only occur at high amplitudes of the input signal. In normal speech, these high amplitudes occur only rarely, but often enough to be noticeable and annoying if they get back as echo to the far end talker. This means that according to an exemplary embodiment nonlinear suppression does not have to be applied all the time. Therefore, according to an exemplary embodiment not the over subtraction parameter for the linear echo is increased since this will indeed introduce too much subtraction during most of the time. Instead, it is desirable to subtract the nonlinear echo only when it occurs. When viewed in the frequency domain, one sees that the nonlinearities occupy only specific frequency bands. Since they are harmonics of the linear signal, they mainly occur in higher frequency regions. Due to the fact, that the highest excursions of the voice coil occur around the resonance frequency of the mechanical system of the loudspeaker which is around 1000 Hz in mobile telephones, it is possible to even further reduce the frequency region where nonlinearities are to be expected. This gives a second possible advantage of an exemplary embodiment in which the linear over subtraction is not increased, since according to this embodiment no subtraction in the wrong frequency bins may occur. According to this exemplary embodiment, the nonlinear parts of the echo signal are controlled independently and only occasionally at limited frequency regions.

Figure 4:
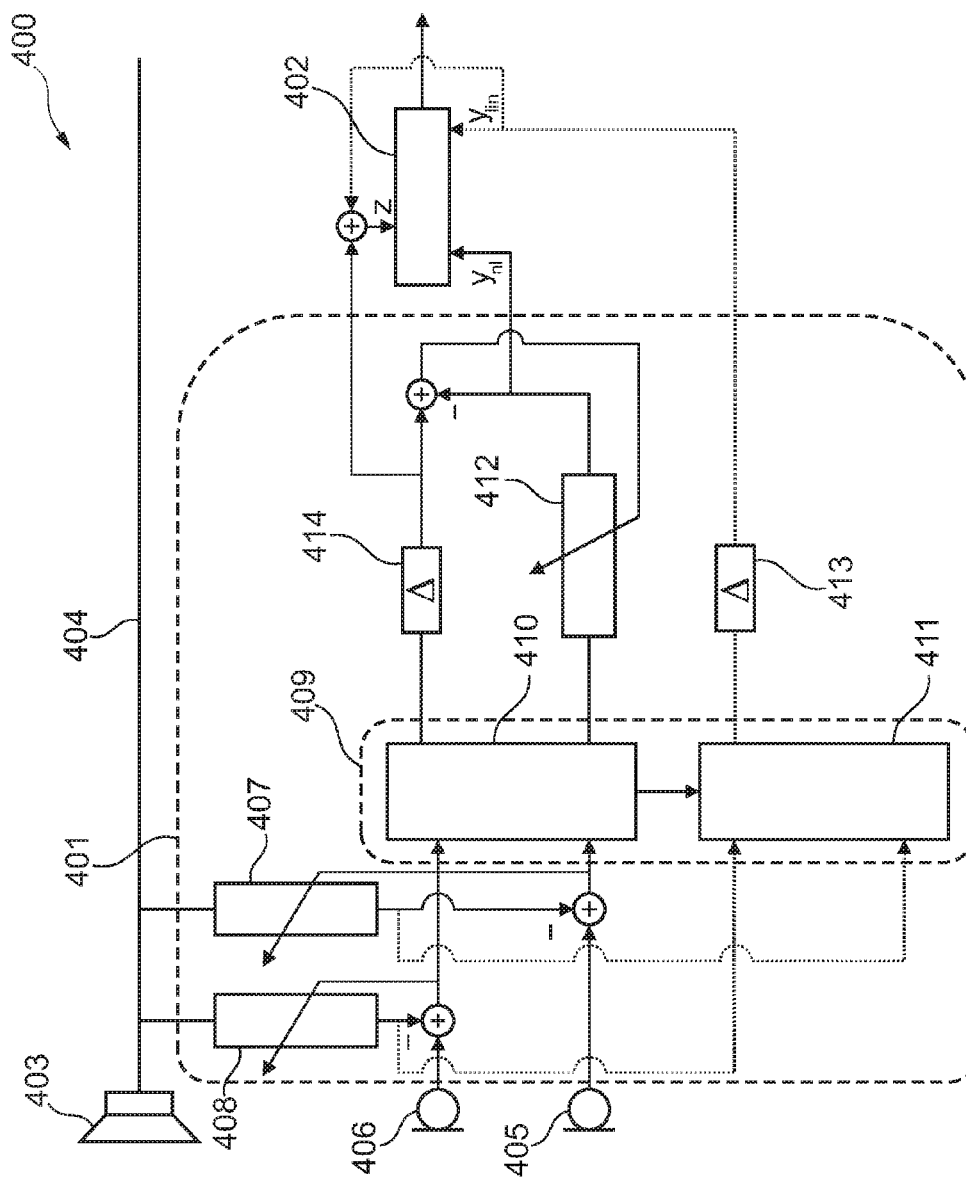
FIG. 4 schematically shows a device for audio processing according to an exemplary embodiment of the invention.

FIG. 4 schematically shows a device for audio processing according to an exemplary embodiment of the invention. The device 400 comprises a pre-processing unit 401 and a post processing unit 402. Furthermore, the device comprises a loudspeaker 403 which receives a first audio signal on line 404 and a first microphone 405 and a second microphone 406 acting as pick-up units. The pre-processing unit 401 comprises a first adaptive filter 407 and a second adaptive filter 408, a beam forming unit 409 comprising a first beam forming subunit 410 and a second beam forming subunit 411 and an additional adaptive filter 412.

The line 404 further transmits the received first audio signal to the first and second adaptive filters 407 and 408. An output, e.g. a first intermediate echo signal, of the first adaptive filter 407 is subtracted from an audio signal picked-up by the first microphone 405 forming a first portion of a picked-up second audio signal. The resulted signal, e.g. a first portion of a preprocessed second audio signal or a first residual signal, forms a first input of the first beam forming subunit 410 and further forms a feedback for the first adaptive filter 407. An output of the second adaptive filter 408, e.g. a second intermediate echo signal, is subtracted from a signal picked-up by the second microphone 406 forming a second portion of the picked-up second audio signal. The resulted signal, e.g. a second portion of the preprocessed second audio signal or a second residual signal, forms a second input of the first beam forming subunit 410 and further forms a feedback for the first adaptive filter 408. The outputs of the first adaptive filter 407 and of the second adaptive filter 408, i.e. the first intermediate echo signal and the second intermediate echo signal, are also connected to the second beam forming subunit 411 which generates a signal corresponding to a first echo cancellation component or signal $y_{lin}$, which is delayed by a first delay element 413 and then fed into the post-processing unit 402. The first echo cancellation component $y_{lin}$ corresponds to a linear echo component. The first beam forming subunit 410 generates a primary output signal which is delayed by a second delay element 414, then added to the first echo cancellation component $y_{lin}$ and then forms a second input z to the post-processing unit 402. Furthermore, the first beam forming generates a third intermediate signal which is fed into the additional adaptive filter 412 which forms a second echo cancellation component $y_{nl}$ there from, which corresponds to a non-linear echo component and is fed into the post-processing unit 402 as a third input. Furthermore, the second echo cancellation component is subtracted from the delayed primary output signal of the first beam forming subunit 410 to form a control signal which is used to control the additional adaptive filter 412.

In the following the operation of the device 400 and of the corresponding algorithm used to build an echo cancellation device will be explained in more detail. First, the adaptive filters 407 and 408 (also called acoustic echo cancellers) estimate the path between the loudspeaker and the respective microphone. The first and second portions of the preprocessed second audio signal which still contains a part of the echo is fed into the first beam forming subunit 410. The first beam forming subunit 410 is programmed such, that the power of its primary output (desirably consisting of near-end speech) is maximized. Then, its coefficients are copied to the second beam forming subunit 411 (also called "shadow beam forming subunit or shadow FSB) which itself is not adaptive. The first and second intermediate echo signals, (dashed lines in FIG. 4) are fed into the second beam forming subunit 411. This is to ensure that the linear echo is processed the same way as the residual signals of the adaptive filters 407 and 408. If the output signals of the two beam forming subunits 410 and 411 were added, this would yield the same result as if the microphone signals in total were processed by the first beam forming subunit 410 but without the benefit of having the signals separated. Thus, as a first step the linear echo is separated from the desired speech signal and the non-linear echo after beam forming. Since only the linear part of the echo was subtracted from the microphone input, the residuals going into the first beam forming subunit 410 still contain the non-linear signals which are introduced by the echo path. The primary output as well as the noise reference of first beam forming subunit 410, thus, contain nonlinearities, too. To further remove these from the primary output, the additional adaptive filter 412 is placed between the noise reference and primary output which tries to identify correlated signal and remove it. This additional adaptive filter 412 forming a second stage of the generalized side lobe canceller (GSC) is only allowed to adapt during far-end speech and, thus, adapts on the loudspeaker, considering it as the "interfering speaker" if one looks at it as a typical GSC approach. The delay elements denoted by 413 and 414 compensate the delay introduced by the additional adaptive filter 412.

The post-processor applied in the exemplary embodiment shown in FIG. 4 takes more input signals than the one described above, thus, more than one signal are spectrally subtracted and each of these subtractions is individually controlled by an over-subtraction parameter. The signals being fed into the post-processor are:

the estimated and beam formed linear echo $y_{lin}$, the beam formed total microphone signal z which results from an addition of the primary output of the first beam forming subunit and $y_{lin}$, the output signal $y_{nl}$ of the additional adaptive filter which contains the nonlinearities occurring in the primary output signal of the first beam forming subunit and showing a correlation to the noise reference.

After applying a Hanning window and an FFT on a frame basis, the complex spectra $Z(f)Y_{lin}(f)$, and $Y_{nl}(f)$ are obtained. The spectrum of a residual phase signal R(f) is obtained by subtracting the complex spectra $$R(f)=Z(f)-Y_{lin}(f) \text{ (far end activity)}$$

$$R(f)=Z(f)-Y_{lin}(f)-Y_{nl}(f) \text{ (no far end activity)}$$

As can be seen, the nonlinear echo signal is only subtracted during far end activity. This has two reasons:
1. when there is no far end activity it is not at all necessary to subtract the nonlinear part since it does not contain echo.
2. during near-end speech only, the desired speech is not affected by speech leakage in the second stage of the GSC.

It should be noted that during far-end activity R(f) equals the spectrum of the primary output of the first beam former subunit and that during no far end activity R(f) equals the spectrum of the difference of the primary output signal and the signal $y_{nl}$ Instead of applying the signals directly to a spectral subtraction a gain function G is determined from the amplitude spectra of these signals according to:

$$|G(f)| = \frac{|Z(f)| - \gamma_{lin}|Y_{lin}(f)| - \gamma_{nl}|Y_{nl}(f)|}{|R(f)|}$$

which represents a frequency dependent gain for the residual phase spectrum R(f). The $\gamma_{xy}$ values denote the amount of over subtraction for the specific signal. To overcome the problem of musical tones which occur if there are strong fluctuations in the gain function, recursive smoothing is applied. After that, R(f) is multiplied with |G(f)| which ensures that the phase of R(f) is left untouched and, therefore, the output signal of the post-processor will have the same phase as the input signal.

After applying the gain function, a transformation in the time domain is done which yields the output signal of the proposed algorithm.

Figure 5:
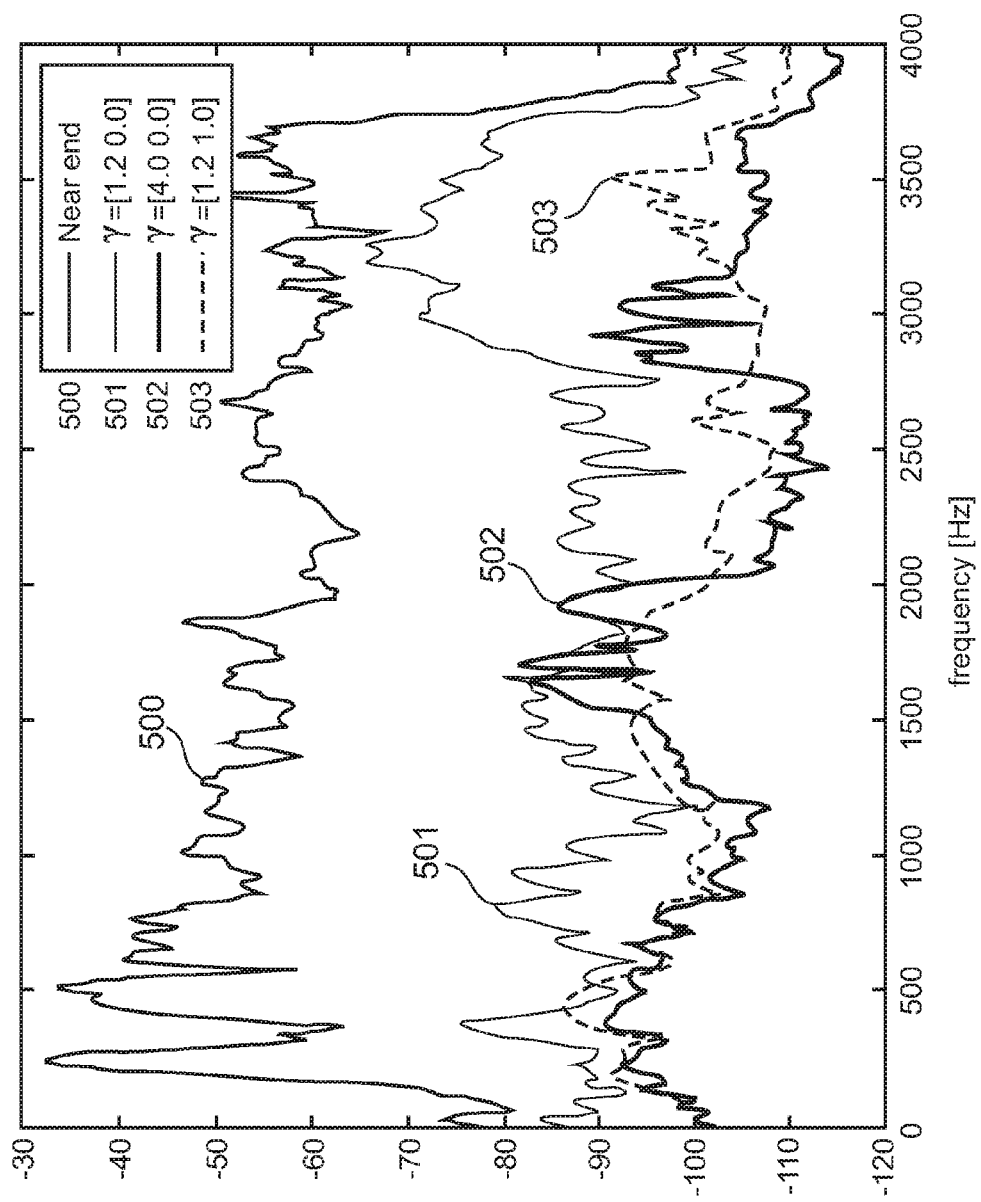
FIG. 5 schematically shows output signals during far end speech.

FIG. 5 schematically shows the behavior of the algorithm in the spectral domain during far end activity. Line 500 depicts the near-end speech signal. An over subtraction factor of 1.2 for the linear part only cannot cope with the nonlinearities occurring between 3 kHz and 4 kHz which can be clearly identified by the line 501. Increasing the linear over subtraction up to a value of 4 clearly reduces the nonlinearities as can be seen by the line 502, however by paying the price of distorting a possible near-end speech signal during double talk (all the time and not only when the nonlinearities occur). By leaving the linear over subtraction at 1.2 and introducing a subtraction of the nonlinear signal (by a factor of 1.0, thus, no over-subtraction), one obtains approximately the same result, yet, the near-end speech is only affected by nonlinear suppression during occurrence of nonlinearities.

Summarizing according to an exemplary aspect of the invention a method may be provided which is suitable to cope with non-linear echo paths during acoustic echo cancellation in speakerphones. Non-linear paths occur particularly in hands-free operation of, e.g., a mobile phone, due to driving the amplifier and loudspeaker in the non-linear range. The idea of this exemplary aspect is to combine the commonly known one microphone approach of linear acoustic echo cancellation using an adaptive filter and a post-processor together with a multiple microphone approach using beam forming which separately removes the non-linear part of the echo.

It should be noted that the term "comprising" does not exclude other elements or features and the "a" or "an" does not exclude a plurality. Also elements described in association with different embodiments or aspects may be combined. It should also be noted that reference signs in the claims shall not be construed as limiting the scope of the claims.

The invention claimed is:

1. A device for processing an audio signal, the device comprising:
   a pre-processing unit; and
   a post processing unit,
   wherein the pre-processing unit is configured to estimate a first echo signal indicative for a first linear echo cancellation component based on a received first audio signal and is further configured to estimate a second echo signal indicative for a non-linear echo cancellation component based on the received first audio signal and a picked-up second audio signal;
   wherein the post-processing unit is configured to process a primary output signal associated with the picked-up second audio signal depending on the first echo signal and the second echo signal.

2. The device according to claim 1,
   wherein the post-processing unit is configured to process the primary output signal by depending on the first echo signal and the second echo signal independently from each other.

3. The device according to claim 1,
   wherein the post-processing unit is further configured to take the second echo signal only in time periods the device receives a received first audio signal.

4. The device according to claim 1, further comprising:
   at least one pick-up unit for picking up the picked-up second audio signal.

5. The device according to claim 1, further comprising:
   an audio source unit, wherein the audio source unit is configured for emitting an audio signal corresponding to the received first audio signal.

6. The device according to claim 1, wherein the pre-processing unit comprises two filter units for estimating a first intermediate echo signal and a second intermediate echo signal.

7. The device according to claim 1, wherein the pre-processing unit comprises: a beam forming unit for estimating the first echo signal and the second echo signal.

8. The device according to claim 7, wherein the beam forming unit is configured to receive the first intermediate echo signal, the second intermediate echo signal, and a preprocessed picked-up second audio signal.

9. The device according to claim 8, wherein the beam forming unit comprises a first beam forming subunit and a second beam forming subunit.

10. The device according to claim 9, wherein the first beam forming subunit is configured to generate the primary output signal and a third intermediate echo signal.

11. The device according to claim 10, wherein the first beam forming subunit comprises an additional filter unit for filtering the third intermediate echo signal to generate the second echo signal.

12. The device according to claim 10, wherein the first beam forming subunit is further configured to determine values of control coefficients in such a way that the output power of the primary output signal is maximized.

13. The device according to claim 12, wherein the second beam forming subunit is configured to receive the first intermediate echo signal and the second intermediate echo signal and to generate the first echo signal by using the values of the control coefficients.

14. The device according to claim 10, wherein the post-processing unit is configured to generate an output signal based on the primary output signal, the first echo signal and the second echo signal by spectral subtracting the first echo signal, the second echo signal from the summed primary output signal and the first echo signal.

15. The device according to claim 14, wherein the post-processing unit is configured for generating a gain function from amplitude spectra of the primary output signal, the first echo signal, the second echo signal and linear combinations thereof.

16. The device according to claim 15, wherein the post-processing unit is configured to multiply the spectrum of the primary output signal, or the spectrum of the difference of the primary output signal and the second echo signal, by the gain function.

17. A method of processing an audio signal, the method comprising:
receiving a first audio signal,
using a pre-processing unit for estimating a first echo signal indicative for a first linear echo cancellation component based on the received first audio signal,
picking up a second audio signal,
using a post processing unit for estimating a second echo signal indicative for a non-linear echo cancellation component based on the received first audio signal and the picked-up second audio signal, and
processing a primary output signal associated with the picked-up second audio signal depending on the first echo signal and the second echo signal.

18. The method according to claim 17, wherein the processing of the picked-up second audio signal involves spectral subtraction.

19. The method according to claim 18, wherein the spectral subtraction is performed independently for the first echo signal and the second echo signal.

20. A non-transient computer-readable medium, in which a computer program is stored which, when being executed by a processor, is configured to control or carry out a method of processing an audio signal, the method comprising:
receiving a first audio signal,
estimating a first echo signal indicative for a first linear echo cancellation component based on the received first audio signal,
picking up a second audio signal,
estimating a second echo signal indicative for a non-linear echo cancellation component based on the received first audio signal and the picked-up second audio signal, and
processing a primary output signal associated with the picked-up second audio signal depending on the first echo signal and the second echo signal.

* * * * *